(12) United States Patent
Herz et al.

(10) Patent No.: US 7,251,548 B2
(45) Date of Patent: Jul. 31, 2007

(54) PROGRAMMING OF AN EXTENDED PATH FOR AN AUTONOMOUS MOBILE UNIT FOR THE SUBSEQUENT TRAVERSING OF PATH SECTIONS THAT ARE TEMPORARILY BLOCKED

(75) Inventors: Torsten Herz, Effeltrich (DE); Michael Fiegert, München (DE)

(73) Assignee: Siemens Aktiengesellschaft, Munich (DE)

( * ) Notice: Subject to any disclaimer, the term of this patent is extended or adjusted under 35 U.S.C. 154(b) by 711 days.

(21) Appl. No.: 10/485,557

(22) PCT Filed: Aug. 2, 2002

(86) PCT No.: PCT/DE02/02851

§ 371 (c)(1),
(2), (4) Date: Feb. 3, 2004

(87) PCT Pub. No.: WO03/014852

PCT Pub. Date: Feb. 20, 2003

(65) Prior Publication Data

US 2004/0210359 A1    Oct. 21, 2004

(30) Foreign Application Priority Data

Aug. 3, 2001    (DE) .............. 101 38 259

(51) Int. Cl.
G01C 22/00    (2006.01)
G05D 1/02    (2006.01)
G05D 1/00    (2006.01)
G05B 19/18    (2006.01)

(52) U.S. Cl. .............. 701/23; 701/25; 701/26; 701/202; 700/253

(58) Field of Classification Search .............. 701/23, 701/26, 25, 27, 28, 202, 206, 210, 211, 301; 700/245, 253, 255; 340/435, 436, 995.21; 15/319; 318/568.11, 568.12
See application file for complete search history.

(56) References Cited

U.S. PATENT DOCUMENTS 5,659,476 A * 8/1997 LeFebvre et al. .......... 701/201

(Continued)

FOREIGN PATENT DOCUMENTS

DE    198 04 195    8/1999

OTHER PUBLICATIONS

Schmidt et al., "An Advanced Planning and Navigation Approach for Autonomous Cleaning Robot Operations", IEEE/RSJ International Conference on Robots and Systems 1998, pp. 1230-1235.

(Continued)

Primary Examiner—Thomas Black
Assistant Examiner—Christine M. Behncke
(74) Attorney, Agent, or Firm—Staas & Halsey LLP (57) ABSTRACT

When a sub-section of a predefined path temporarily cannot be traversed by an autonomous mobile unit, an extended path is found for subsequently traversing the temporarily blocked sub-section. A first path point of the predefined path is determined using at least one predefinable distance criterion, which takes into consideration the distance of the temporarily blocked sub-section from the first path point. An extension sub-section is determined which begins at the first path point, terminates at a second path point of the predefined path and encompasses at least the temporarily blocked sub-section. The extended path is programmed with the extension sub-section being integrated into the predefined path at the first path point.

15 Claims, 8 Drawing Sheets

U.S. PATENT DOCUMENTS

| | | | |
|---|---|---|---|
| 6,240,342 B1* | 5/2001 | Fiegert et al. | 701/25 |
| 6,496,754 B2* | 12/2002 | Song et al. | 700/245 |
| 6,574,536 B1* | 6/2003 | Kawagoe et al. | 701/23 |
| 2004/0068352 A1* | 4/2004 | Anderson | 701/25 |
| 2004/0117079 A1* | 6/2004 | Hulden | 701/23 |

OTHER PUBLICATIONS

Kurabayashi et al., "Local Path Re-Planning for Unforeseen Obstacle Avoidance by an Autonomous Sweeping Robot", IEEE International Conference on Robotics & Automation, 1998, pp. 3151-3158.

Arkin et al., "Approximation Algorithms For Lawn Mowing and Milling", Applied Mathematics and Computer Science 1997, University of Cologne, Report. No. 97.255.

Cormen et al., Introduction to Algorithms, $23^{rd}$ ed , The MIT Press, 1999, pp. 527-531.

* cited by examiner

PROGRAMMING OF AN EXTENDED PATH FOR AN AUTONOMOUS MOBILE UNIT FOR THE SUBSEQUENT TRAVERSING OF PATH SECTIONS THAT ARE TEMPORARILY BLOCKED

CROSS REFERENCE TO RELATED APPLICATIONS

This application is based on and hereby claims priority to German Application No. 10138259.6 filed on Aug. 3, 2001, the contents of which are hereby incorporated by reference.

BACKGROUND OF THE INVENTION

1. Field of the Invention

The invention relates to a method and system for programming an extended path for an autonomous mobile unit and to a computer program product and a computer-readable storage medium with a computer program stored thereon for programming an extended path for an autonomous mobile unit.

2. Description of Related Art

Repetitive activities are increasingly being reassigned to service robots. Examples of such activities include cleaning, transporting, distributing seed over relevant areas, and lawn mowing.

The problem with the service robots, to which associated surface-processing devices are attached, is that the surface-processing device is expected to cover as much of the available space as possible with as few paths as possible being traversed more than once. Moreover, the effort needed to program this path must be sufficiently low to require little computing capacity. This is the only way to ensure acceptable time characteristics during the programming process.

There is the added problem in the case of a cleaning robot whose function is to perform cleaning tasks in a supermarket, for instance, that additional obstacles in the form of customers with trolleys appear when the robot is being used while the supermarket is open for business. If the dimensions of the work area and the position of the obstacles located therein are known, it is possible with the aid of a pre-programming method to program an optimum path the traversing of which takes minimum time while simultaneously taking into consideration as much of the surface to be traversed as possible. The service robot starts traversing the path when the pre-programmed path has been pre-programmed and determined.

A pre-programming method of this type is known, for example, from DE 198 04 195 A1. However, any obstacles that may briefly appear, for example customers with their trolleys, consequently cannot be taken into consideration when the path is being pre-programmed. In this case the service robot detects the obstacles while moving. The robot takes evasive action, which is to say it departs from the pre-programmed path, bypasses the obstacle, and returns after the evasive action to its original path. A type of programming and execution of such evasive action is also known from DE 198 04 195 A1. However, the section of the original path that was not traversed owing to the evasive action remains unprocessed or uncleaned at this time and will have to be processed or cleaned subsequently.

Two different post-programming methods are known for subsequently processing unprocessed path sections of this type. In the case of the first post-programming method, the previously executed pre-programming method is executed a second time. The already traversed and accordingly processed sub-section of the original path is no longer taken into consideration here, while the unprocessed, omitted sub-section is taken into consideration during subsequent programming.

The disadvantage of this method, however, is that a completely new path is determined for the remaining section of the original path still to be processed on account of taking the omitted sub-section into consideration. Yet this complete re-programming results in unnecessarily long programming times and places a high demand on computing power. A provision in this case of the second known post-programming method is for the unprocessed path section to be appended at the end of the original path and to be traversed on completion of the path. However, this method results in unnecessarily extended paths and so is also inefficient.

Other path programming methods are known from "Approximation Algorithms for Lawn Mowing and Milling", Arkin E. M. et al., Angewandte Mathematik und Informatik (Applied Mathematics and Computer Science), University of Cologne, Report No. 97.255, 1997.

SUMMARY OF THE INVENTION

An object of the invention is accordingly to disclose a path programming method for an autonomous mobile unit facilitating efficient and flexible programming of a path extended to include an alternative path.

This object may be achieved by a method for programming an extended path for an autonomous mobile unit to determine a sub-section of a predefined path which cannot be traversed by the autonomous mobile unit. A non-traversable sub-section of this kind may occur if an obstacle blocks the predefined path. Such blocking is generally only temporary so that the sub-section is at times non-traversable.

The method further entails determining a first path point of the predefined path using at least one predefinable distance criterion which takes into consideration a distance from the sub-section to the first path point. An extension sub-section is thereupon determined which begins at the first path point, terminates at a second path point of the predefined path, and encompasses at least the sub-section. When the extended path is programmed, the extension sub-section is integrated into the predefined path at the first path point.

The system for programming an extended path for an autonomous mobile unit has a path programming unit, for example a computer processor, which is set up to perform the following steps. A section of a pre-determined path can be determined which is a sub-section of the path and which cannot be traversed by the autonomous mobile unit. A first path point of the predefined path can furthermore afterwards be determined using at least one predefinable distance criterion which takes into consideration a distance from the sub-section to the first path point. An extension sub-section can thereupon be determined which begins at the first path point, terminates at a second path point of the predefined path, and encompasses at least the sub-section. When the extended path is programmed, the extension sub-section can be integrated into the predefined path at the first path point.

The computer program product, which includes a computer-readable storage medium on which a program is stored, allows a computer, after the program has been loaded into a memory of the computer, to execute the following steps for programming an extended path for an autonomous mobile unit. A section of a pre-determined path can be determined which is a sub-section of the path and which cannot be traversed by the autonomous mobile unit. A first path point of the predefined path can furthermore afterwards be determined using at least one predefinable distance criterion which takes into consideration a distance from the sub-section to the first path point.

An extension sub-section can thereupon be determined which begins at the first path point, terminates at a second path point of the predefined path, and encompasses at least the sub-section. When the extended path is programmed, the extension sub-section can be integrated into the predefined path at the first path point.

On the computer-readable storage medium a program is stored which allows the computer, after the program has been loaded into a storage medium of the computer, to execute the following steps for programming an extended path for an autonomous mobile unit. A section of a predetermined path can be determined which is a sub-section of the path and which cannot be traversed by the autonomous mobile unit. A first path point of the predefined path can furthermore afterwards be determined using at least one predefinable distance criterion which takes into consideration a distance from the sub-section to the first path point.

An extension sub-section can thereupon be determined which begins at the first path point, terminates at a second path point of the predefined path, and encompasses at least the sub-section. When the extended path is programmed, the extension sub-section can be integrated into the predefined path at the first path point.

The system, the computer program product, and the computer-readable storage medium are particularly suitable for carrying out the method according to the invention or one of its developments explained in the following.

A particular advantage of the invention is that when the extended path is being programmed the predefined, original path is used as a basis for programming additional subsections of the extension path which only extend or supplement the predefined path. This obviates the need for re-programming which would result in a routing that may be substantially different from the original path. This saves computing power and memory space. The programming process is also accelerated.

The invention has the further advantage that no additional information is needed when the extended path is programmed, such as information requiring to be newly integrated about the surroundings. Only information already contained in the predefined path is used when the extended path is programmed. This is very advantageous especially when the predefined path contains manually integrated knowledge which cannot be generated automatically, or can be generated only with great difficulty.

The developments described in the following relate both to the method and to the system. The invention and developments described in the following can be implemented both as software and as hardware, for example using special electric circuitry. The invention or a development described in the following can furthermore be implemented by a computer-readable storage medium on which is stored a computer program which executes the invention or development.

The invention or any of the developments described in the following can also be implemented by a computer program product having a storage medium on which is stored a computer program which executes the invention or development.

Other criteria can be used besides the distance criterion when the first path point is being determined, for example a cinematic criterion taking into consideration a cinematic characteristic of the autonomous mobile unit.

A further criterion or further criteria can be a time criterion and/or a processing criterion taking into consideration a travel time and/or travel route of the autonomous mobile unit.

The first path point can furthermore also be determined by applying standard methods of graph theory according to Dijkstra which are known from "Introduction to Algorithms", Thomas H. Cormen et al., The MIT Press, Cambridge, Mass., 23rd edition, London, 1999, McGraw-Hill Book Company, New York.

The extension sub-section includes, in one embodiment, at least one further sub-section of the predefined path in addition to the sub-section which cannot be traversed by the autonomous mobile unit. It is also possible for the extension sub-section largely to comprise sub-sections of the predefined path.

In one development, the second path point is identical to the first path point. This, in plain terms, means the autonomous mobile unit departs from the originally programmed path at one path point, traverses the sub-section which could not be traversed at an earlier time, then returns at the same path point to the originally programmed path.

In certain circumstances, for example when the path routing is complex, it may be favorable in terms of achieving as short and effective path routing as possible, for the second path point to be situated on the predefined path after the first path point. This makes it possible to avoid repeated traversing of the same path section.

The method for programming an extended path for an autonomous mobile unit is preferably employed in a recursive path programming method in such a way that the extended path, which was determined in a preceding iteration step, is the predefined path of an iteration step following the preceding iteration step. This makes it possible to promptly take into consideration any suddenly appearing new obstacles by an extension program without the need to determine a completely new path whenever new obstacles appear. The method or a development thereof is employed in one embodiment in a cleaning robot which, in this case, traverses the extended path in the course of a cleaning activity and cleans at least sections of the extended path.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 2:
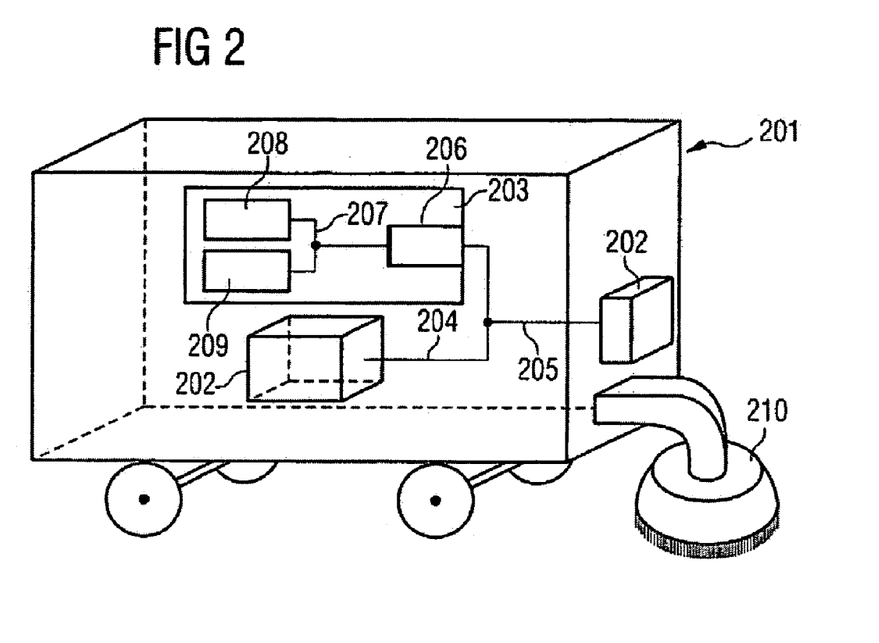
FIG. 2 is a schematic perspective view of a cleaning robot with a cleaning device and recording means.

FIG. 2 shows a cleaning robot 201 with a cleaning device 210 and a plurality of laser scanners 202. The laser scanners 202 record images of the surroundings of the cleaning robot 201 and route the images to a computing unit 203 via connections 204, 205. The image signals are routed to the memory 208 via an input/output interface 206 connected via a bus 207 to a memory 208 and a processor 209.

The method described in the following is executed in the processor 209. The processor 209 is therefore set up such that the method-related steps described in the following are executable.

Figure 1:
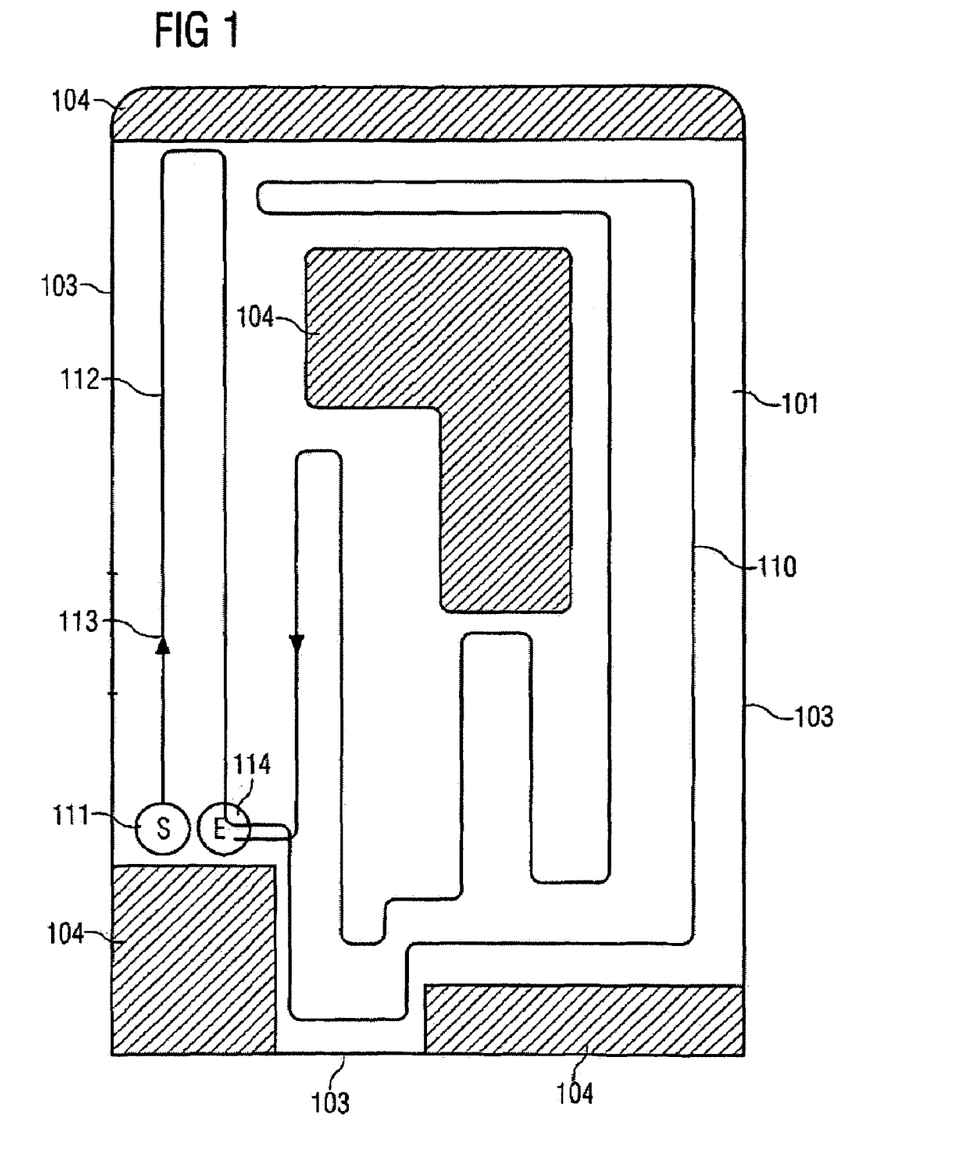
FIG. 1 is a map of a space to be cleaned by a cleaning robot with a pre-programmed cleaning path.

FIG. 1 is a symbolic depiction of the map 101 produced by the cleaning robot 201 representing a space to be cleaned by the cleaning robot 201. In plain terms, a map 101 of this type is an electronic image of the space to be cleaned.

The map 101 is produced by the cleaning robot 201 in such a way that the robot moves through the space and, by the laser scanners 202, records images of its surroundings at different instances and at different locations in the space to be cleaned. The recorded images of the space are stored by the cleaning robot 201 and brought together into the map 101 which is also stored. Walls 103 within the space as well as obstacles 104 in the form of shelving or cabinets protruding into the space are therefore imaged in the map 101.

With the aid of the map 101, as part of a pre-programming action using a pre-programming method the cleaning robot 201 determines an optimal, pre-programmed cleaning path 110 the traversing of which will take a minimum length of time but take into consideration as much as possible of the area comprising the space to be traversed and cleaned. The pre-programmed cleaning path 110 is entered in the map 101 and stored.

FIG. 1 shows the pre-programmed path 110. The pre-programmed path 110 starts at point S (start) 111 and leads from there along an indicated path line 112 in the direction of the arrow 113 to point E (end) 114. The pre-programming method executed by the cleaning robot 201 is described in DE 198 04 195 A1.

When pre-programming has been completed and the pre-programmed path 110 has been determined, as part of a cleaning process the service robot begins to traverse the path 110. During the cleaning process the cleaning device 210 of the cleaning robot 201 is in active contact with the floor of the space to be cleaned.

The cleaning robot 201 moves along the pre-programmed and stored path 110 or indicated path line 112 and records images of its surroundings at periodic intervals. The robot 201 orientates itself in the space by comparing the recorded images with the stored map.

The cleaning robot 201 continues traversing the pre-programmed path 110 until it detects a new obstacle which was not taken into consideration during pre-programming and which is blocking a section of the pre-programmed path 110. An obstacle of this type can be, for instance, a person situated within the space or another mobile item of furniture.

Blocking of the pre-programmed path 110 by the new obstacle prevents a sub-section of the original path 110 from being traversed and requires an alternative path or subsequent cleaning path to be programmed. A subsequent cleaning path of this type includes not only an altered path course in the narrower sense, which is to say not only a path for bypassing the new obstacle and not only an additional subsequent cleaning sub-section integrated at a subsequent point along the pre-programmed path, but the entire, newly programmed path course which also includes path sections remaining unaltered with respect to the pre-programmed path. A programming and execution of a path sub-section for bypassing or circumnavigating an obstacle is described in DE 198 04 195 A1.

Figure 3:
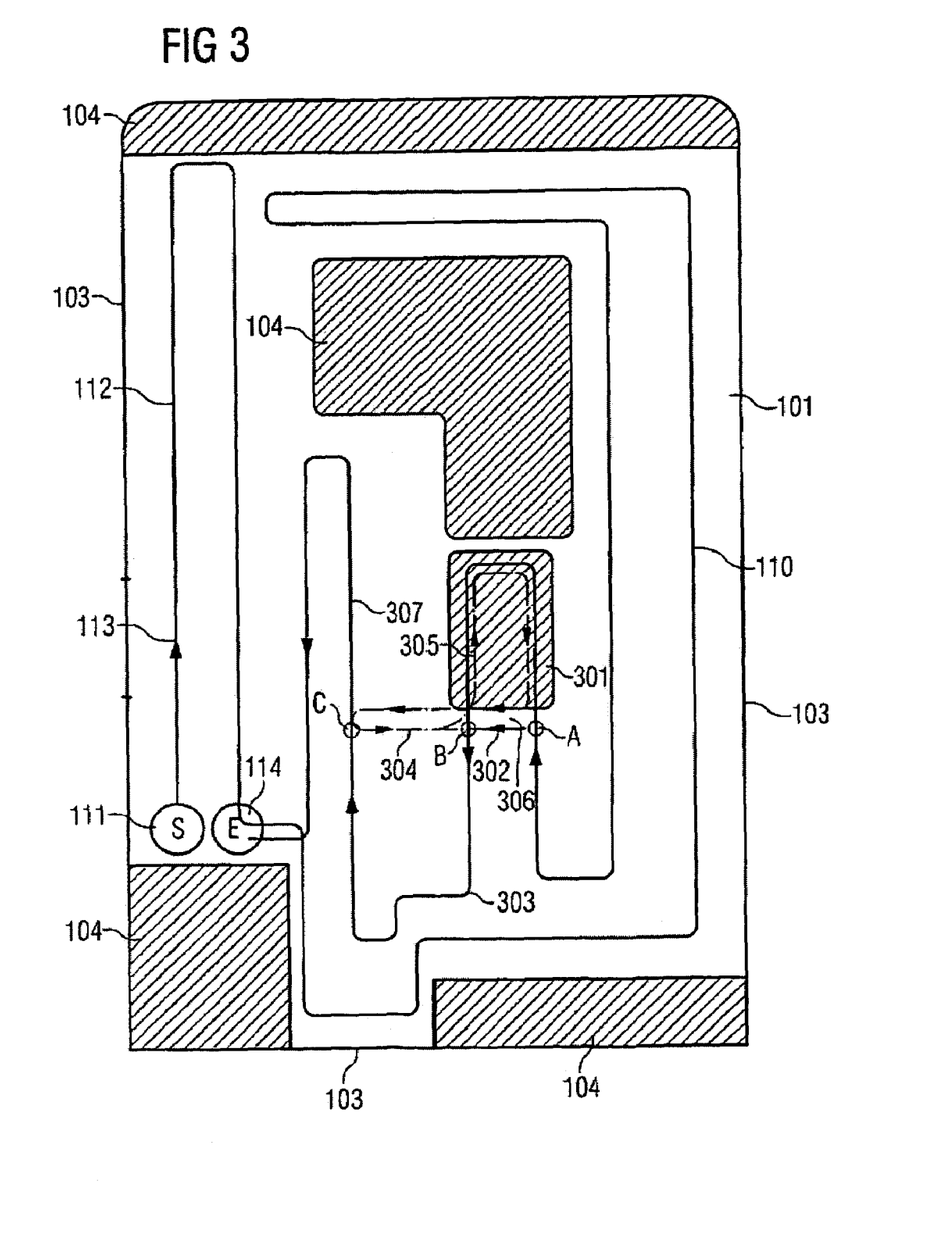
FIG. 3 is a map of a space to be cleaned by a cleaning robot with a pre-programmed cleaning path and an obstacle blocking a section of a pre-programmed path, and an extended subsequent cleaning path.

The programming of a subsequent cleaning path of this type is described in the following. FIG. 3 shows the stored map 101 with the pre-programmed path 110 and a new obstacle 301, and a subsequent cleaning path programmed by the cleaning robot with the path sub-sections 302, 303, 304, 305, 306, and 307.

The following fundamental programming strategies are applied to the programming of a subsequent cleaning path:

a) No subsequent cleaning path will be programmed if an object is blocking a section which is a sub-section of the pre-programmed path and which will be traversed again at a subsequent point along the pre-programmed path. The obstacle will be circumnavigated as closely as possible taking a predefined safety clearance into consideration.

b) If an object is blocking a section which is a sub-section of the pre-programmed path and which will not be traversed again at a subsequent point along the pre-programmed path, a subsequent cleaning path will be programmed in the manner described below:

b0) The subsequent cleaning path will include the path sub-section on which the cleaning robot will circumnavigate the new obstacle as closely as possible while maintaining a predefined safety clearance.

b1) That particular path point in the pre-programmed path will be determined which is situated closest to the pre-programmed path sub-section which is blocked and which will be omitted when the new obstacle is circumnavigated, or to the obstacle. An additional path section will be integrated into the pre-programmed path at this nearest path point.

b2) The sub-section being additionally integrated leads from the nearest path point to that particular path point in the pre-programmed path at which the cleaning robot will depart from the pre-programmed path when circumnavigating the new obstacle or will rejoin the path after circumnavigating the new obstacle (approach sub-section).

b3) The sub-section being additionally integrated furthermore includes the sub-section which will be omitted when the new obstacle is circumnavigated and which will be appended to the approach sub-section.

b4) A return sub-section leading back to the nearest path point will be added to the appended sub-section.

b5) The further course of the subsequent cleaning path will correspond to the original course of the pre-programmed path.

c) The subsequent cleaning path will replace the pre-programmed path during the further course of the cleaning process.

d) If the cleaning robot encounters another new obstacle during the further course of the cleaning process, which is to say while traversing the subsequent cleaning path replacing the original, pre-programmed path, the above described programming strategies will be recursively re-executed analogously.

Figure 5:
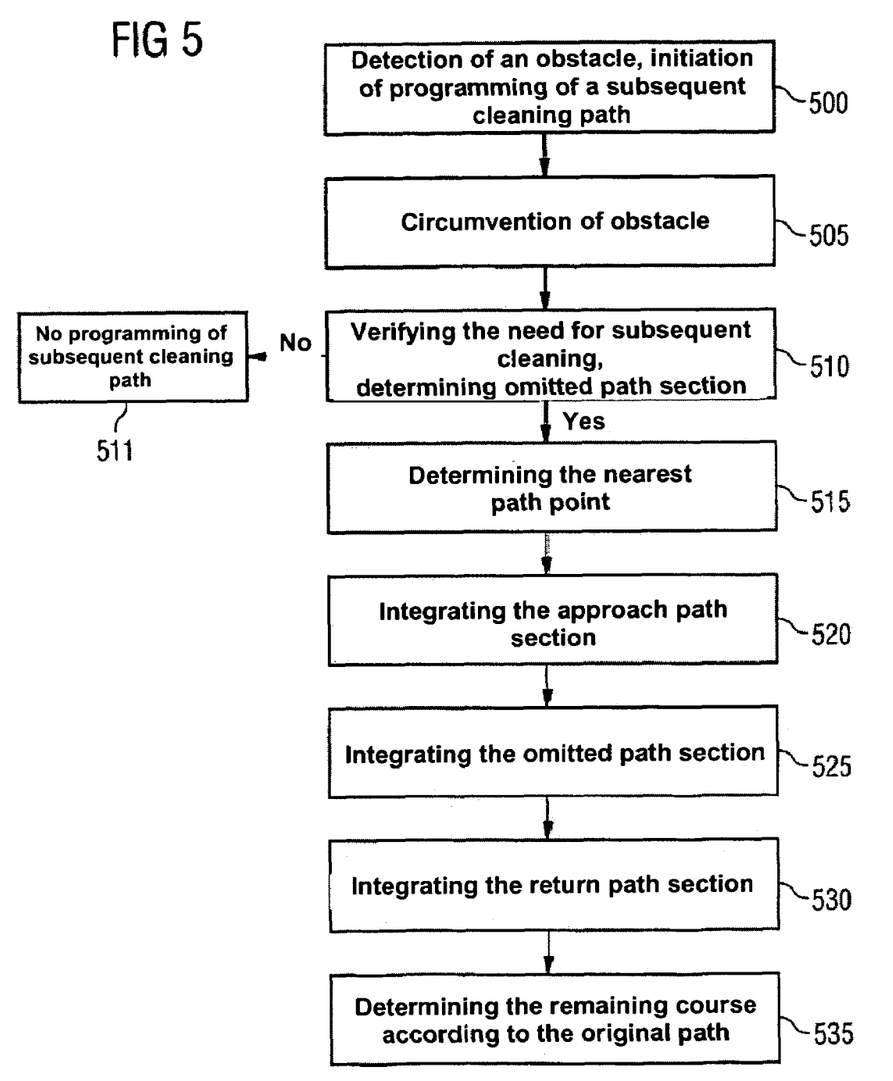
FIG. 5 is a flowchart showing method-related steps of an exemplary embodiment.

According to the above fundamental programming strategies, the cleaning path 302 to 307 described in the following will be determined by the cleaning robot 201. Corresponding method-related steps are shown in FIG. 5. When the cleaning robot 201 reaches path point A, at which it detects the new obstacle 301, it will trigger programming of the subsequent cleaning path 302 to 307 (500). The subsequent cleaning path 302 to 307 leads from the path point A past the new obstacle 301 302, maintaining a predefined safety clearance with respect to the new obstacle 301 (505). The subsequent cleaning path 302 to 307 rejoins the original, pre-programmed path 110 at point B. The cleaning robot stores the fact that the path section 305 which is a section of the pre-programmed path 110 and which is delimited by the points A and B was not traversed or cleaned and so was omitted (505). The cleaning robot 201 then checks whether the non-traversed or omitted path section 305 will be traversed again at a subsequent point in the pre-programmed cleaning path 110 (510).

This does not apply to the pre-programmed cleaning path 110, so that subsequent cleaning of the omitted sub-section 305 and corresponding programming of the subsequent cleaning path 302 to 307 is necessary. Further programming of the subsequent cleaning path 302 to 307 would otherwise be unnecessary (511). The original, pre-programmed path course 112 would continue to apply.

The cleaning robot 201 checks the subsequent path points along the further course of the pre-programmed path 110 to ascertain which path point is situated closest to the omitted path section 305 (515). To do so, it determines the path point C at which path sub-sections 304 to 306 of the subsequent cleaning path 302 to 307 are integrated (515).

The subsequent cleaning path 302 to 307 thereafter proceeds from point B along the original path 110 to point C 303. From point C the subsequent cleaning path proceeds by the shortest link to point B 304, which is the last path point of the omitted sub-section 305 (520).

From point B the subsequent cleaning path 302 to 307 proceeds along the original path 110 to point A 305, with the omitted sub-section 305 being traversed counter to the originally programmed direction of travel and cleaned in he process (525).

From point A the subsequent cleaning path 302 to 307 proceeds to return by the shortest link 306 to point C and so rejoins the original pre-programmed path 110 (530). The subsequent course 307 of the subsequent cleaning path 302 to 307 corresponds to the original course of the pre-programmed path 110 and ends at point E (535).

Alternatives Ai (i=number of the respective alternative) to the exemplary embodiment are described in the following.

In one alternative (A1) to the exemplary embodiment the map 101 is not generated by traversing and recording the space to be cleaned but, instead, was produced in advance by means, for example, of a programming action, and is stored in the cleaning robot.

In a further alternative (A2) to the exemplary embodiment a cinematic criterion taking into consideration a cinematic characteristic of the autonomous mobile unit is employed in addition to the distance criterion when the nearest point C, the integration point of the extension sub-section, is being determined.

If, for example, a cleaning robot 201 has a tricycle cinematic characteristic, which is to say it only moves on three wheels, certain points within the space will only be approachable with considerable difficulty and only with the cleaning robot's having attained a specific orientation. A complex shunting maneuver would have to be executed by the robot in such cases in order to attain a predefined orientation.

With this alternative the nearest point C is displaced along the pre-programmed path until it can also be approached cinematically favorably by the cleaning robot, which is to say without the need for major shunting maneuvers. Subsequent programming steps will be executed in accordance with the original method.

In a further alternative (A3) to the exemplary embodiment a time criterion and a processing criterion taking into consideration a travel time and a travel route of the cleaning robot are employed in addition to the distance criterion when the nearest point C, the integration point of the extension sub-section, is being determined.

With this alternative the nearest point C is displaced along the pre-programmed path until it can also be approached favorably in conditions relating to time and processing. Subsequent programming steps will be executed in accordance with the original method.

Conditions favorable in terms of time are to be understood as cleaning which is of as short a duration as possible. Conditions favorable in terms of processing are to be understood as cleaning positions which are as efficient as possible.

A fourth alternative (A4) to the exemplary embodiment relates to determining the return sub-section 306 (strategy step b4). It may be more favorable in terms of, for example, cleaning efficiency, for the return sub-section to end at a path point along the pre-programmed path which is different from the start point, which is to say at the nearest point C (see also exemplary embodiment). A case such as this is shown in FIG. 4.

Figure 4:
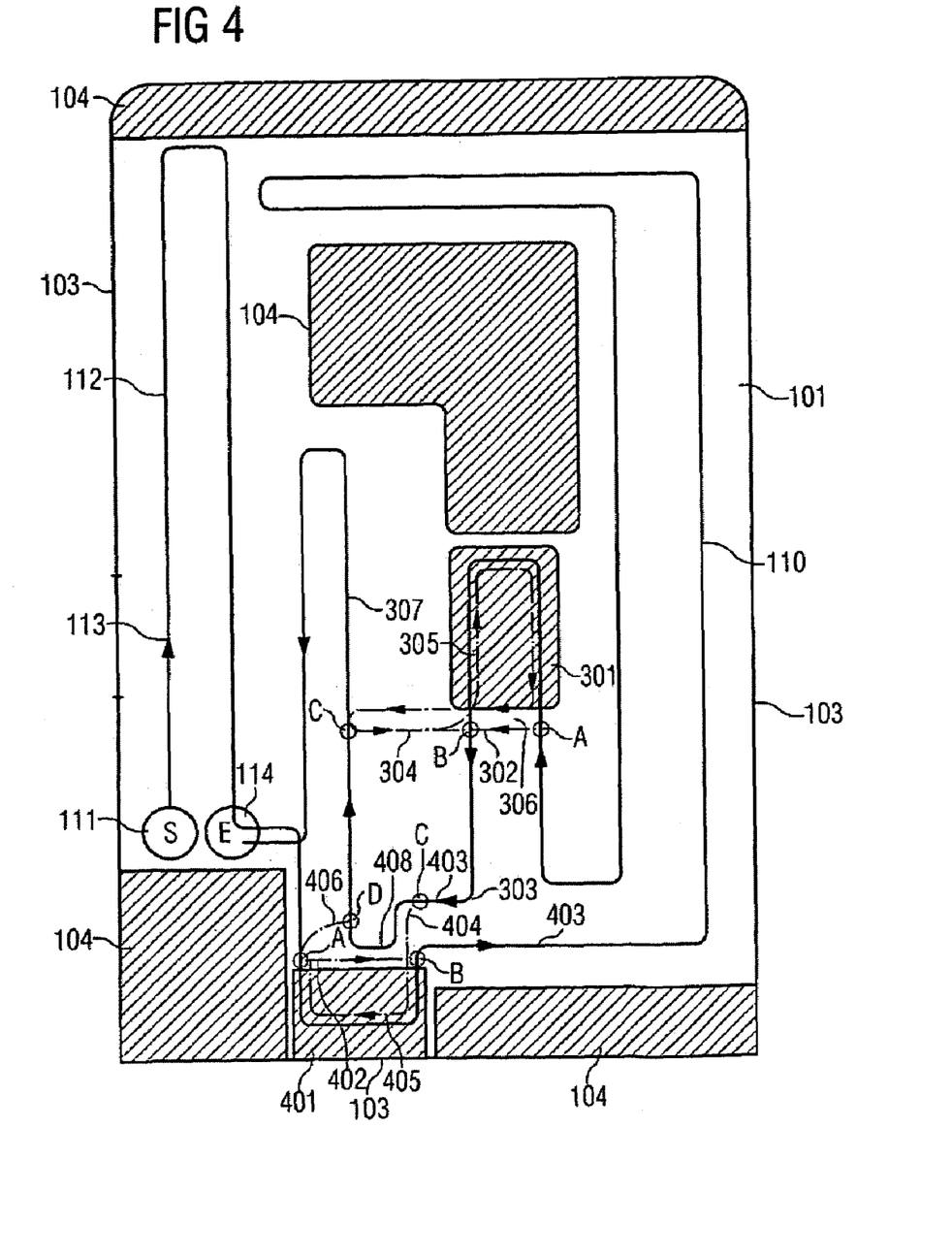
FIG. 4 is a map of a space to be cleaned by a cleaning robot with a pre-programmed cleaning path, a first obstacle blocking a first section of the pre-programmed path, an associated first extended subsequent cleaning path and a second obstacle blocking a second section of the pre-programmed path, and an associated second alternative extended subsequent cleaning path.

FIG. 4 shows the stored map 101 with the configuration according to the exemplary embodiment, which is to say with the pre-programmed path 110, and with the new obstacle 301, and also the subsequent cleaning path which was programmed by the cleaning robot and which has the path sub-sections 302, 303, 304, 305, 307, and 307.

FIG. 4 also shows another new obstacle 401 and the associated subsequent cleaning path which was programmed by the cleaning robot and which has the path sub-sections 402, 403, 404, 405, 406, and 407. In this case the return sub-section 406 does not end at point C but at a point D. The path sub-section 408 of the original path 110 between the points C and D remains uncleaned in this case.

It should be noted that the original programming method can also be modified by any combinations of the described alternatives.

Shown below is a commented log file recorded by the cleaning robot during a cleaning process. A log file of this type is generally produced during a cleaning process (on-line). The cleaning robot records all programming and travel processes, which are stored in the log file. This allows the programming and travel processes to be retraced and checked on completion of the cleaning process. The log file shown below records various path courses traversed by the cleaning robot (FIG. 6a to FIG. 6f) and contains comments on which path courses were determined according to the programming methods described in the preceding.

Log file:

The robot cleans until encountering an obstacle at configuration 129. (FIG. 6a, image 1_129)
No subsequent cleaning is programmed because the robot will in any event be passing through that location again. (FIG. 6b, image 2_219)
However, since the obstacle was still there, the robot again has to take evasive action.
Subsequent cleaning is then programmed:

| | | |
|---|---|---|
| Debug | 16:26:35.838> Recur | [467] 265 200 201 202 203 204 205 206 207 208 209 210 211 212 213 214 215 216 21 |
| Debug | 16:26:35.838> Recur | [487] 219 220 221 222 223 224 225 226 227 228 229 230 231 232 233 234 235 236 23 |
| Debug | 16:26:35.838> Recur | [507] 239 240 241 242 243 244 245 246 247 248 249 250 251 252 253 254 255 256 25 |
| Debug | 16:26:35.838> Recur | [527] 259 260 261 262 263 264 265 |
| Debug | 16:26:35.838> Recur | ********* Detour ready ********* |
| 1 | 16:26:35.838> Recur | detour 265 (6.7 m) [213...223] (14.8 m) 265 (for 564 cells) waiting |

Figure 6A:
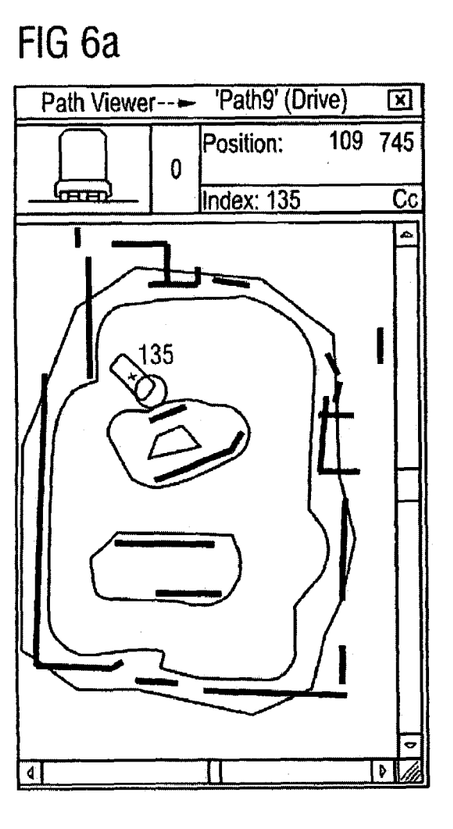
FIGS. 6a to 6f are maps of a space to be cleaned by a cleaning robot with cleaning paths and obstacles according to a recorded log file.
Figure 6B:
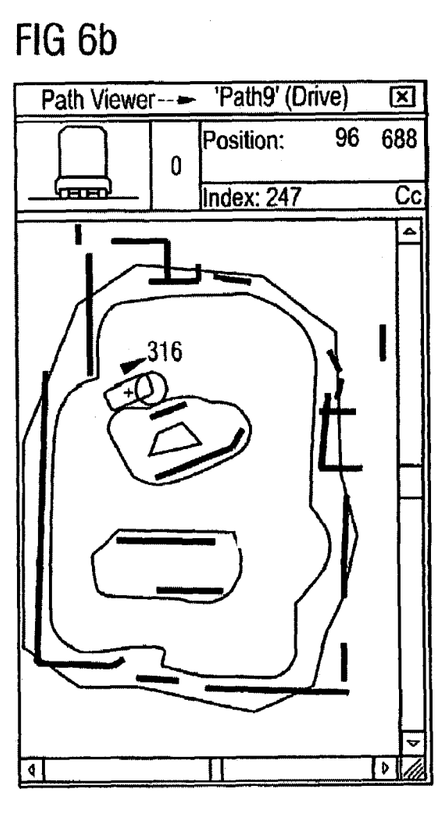
Figure 6C:
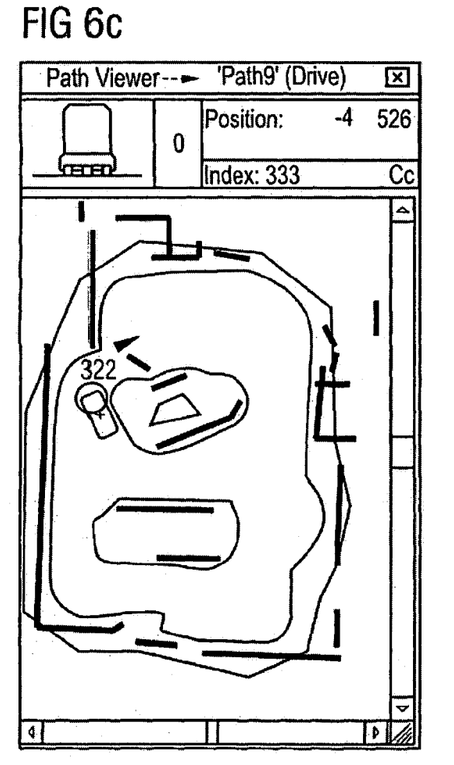
Figure 6D:
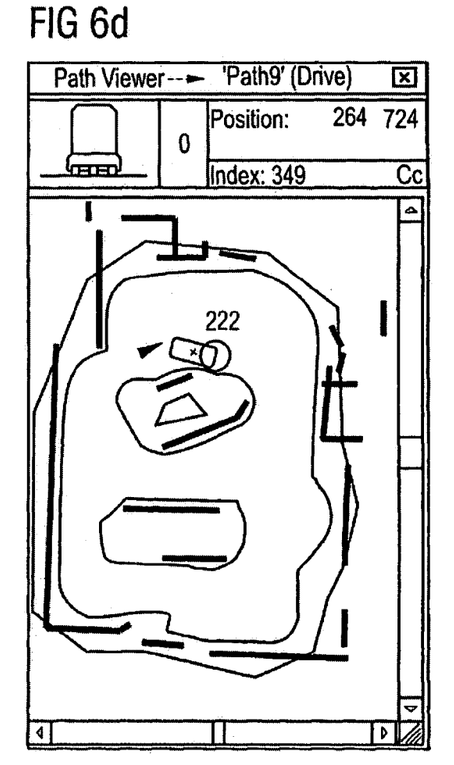
Figure 6E:
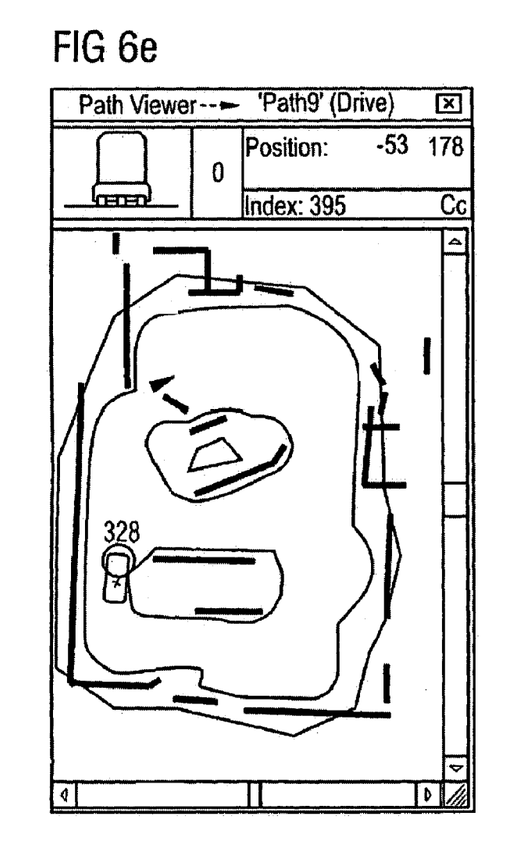
Figure 6F:
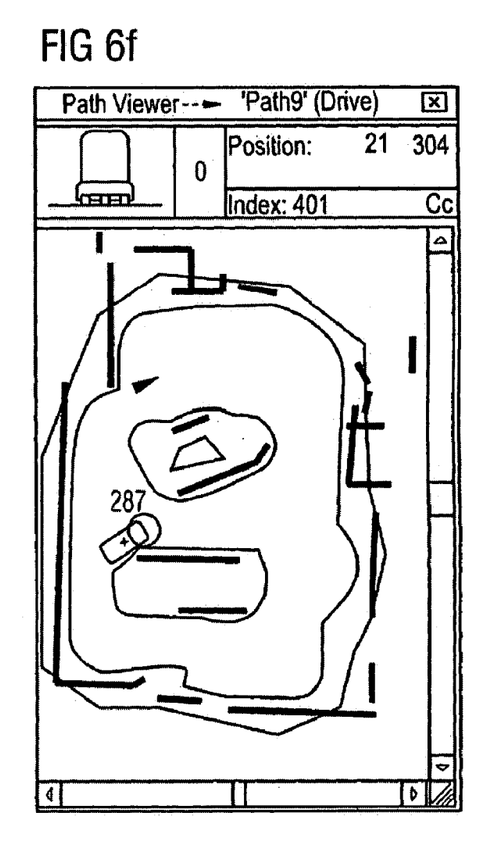

This means that additional configurations 467 to 533 are generated which are integrated into the standard path after 265.
The robot is on its way to rounding the lower island, but it then turns off in an upward direction after configuration 265. (FIG. 6c, image 3_472)
The omitted location will be cleaned subsequently (FIG. 6d, image 4_488) . In order to continue with the side of the aisle next to the island it must then proceed right to the bottom again, but it then resumes its journey at the interrupted location (FIG. 6e, image 5_528; FIG. 6f, image 6_267). The path is then ended with no interruptions.
Extract from the log file:

------------------------> ------------------------------------------------------------
------------

1 16:01:10.175> Mission 923 started (23.05.2001), Version 2.01.02
------------------------> ------------------------------------------------------------
------------

| | | |
|---|---|---|
| 1 | 16:01:10.175> | Mission - start execution of path 'PATH9' |
| ... | | |
| Debug | 16:01:22.933> Recur | Precalc 0: Next look after 171 |
| Debug | 16:01:24.205> Recur | Precalc 1: Next look after 172 |
| 2 | 16:02:32.523> Recur | starts new search for detour |
| Debug | 16:02:32.693> Recur | 5->6 uncleaned: 77 cells now, 5 cells at end |
| Debug | 16:02:32.854> Recur | 6->7 uncleaned: 35 cells now, 6 cells at end |
| Debug | 16:02:33.014> Recur | 7->8 uncleaned: 14 cells now, 7 cells at end |
| Debug | 16:02:33.174> Recur | 23->24 staying uncleaned: 7 cells now, 7 cells at end |
| Debug | 16:02:33.354> Recur | 24->25 staying uncleaned: 16 cells now, 16 cells at end |
| Debug | 16:02:33.575> Recur | 25->26 staying uncleaned: 14 cells now, 14 cells at end |
| Debug | 16:02:33.735> Recur | 26->27 staying uncleaned: 4 cells now, 4 cells at end |
| Debug | 16:02:33.905> Recur | 33->34 staying uncleaned: 5 cells now, 5 cells at end |
| Debug | 16:02:34.065> Recur | 34->35 staying uncleaned: 4 cells now, 4 cells at end |
| Debug | 16:02:34.226> Recur | 35->36 staying uncleaned: 6 cells now, 6 cells at end |
| Debug | 16:02:34.556> Recur | 45->46 uncleaned: 51 cells now, 17 cells at end |
| Debug | 16:02:34.716> Recur | 46->47 uncleaned: 114 cells now, 37 cells at end |
| Debug | 16:02:34.876> Recur | 47->48 uncleaned: 226 cells now, 44 cells at end |
| Debug | 16:02:34.876> Recur | Best cleaning path: 45–48 (98 cells) |
| Debug | 16:02:34.876> Recur | No dirt spot big enough for detour |
| ... | | |
| 2 | 16:15:32.555> Recur | starts new search for detour |
| Debug | 16:15:36.761> Recur | Best cleaning path: 23–27 (41 cells) |
| Debug | 16:15:36.761> Recur | No dirt spot big enough for detour |
| 2 | 16:25:29.884> Recur | starts new search for detour |
| Debug | 16:25:32.097> Recur | Best cleaning path: 213–217 (259 cells) |
| Debug | 16:25:32.097> Recur | Dirt spot likely to be bigger than can be checked now |
| ... | | |
| 2 | 16:26:33.004> Recur | starts new search for detour |
| Debug | 16:26:33.074> Recur | 5->6 staying uncleaned: 7 cells now, 7 cells at end |
| Debug | 16:26:33.135> Recur | 6->7 staying uncleaned: 6 cells now, 6 cells at end |
| Debug | 16:26:33.205> Recur | 7->8 staying uncleaned: 7 cells now, 7 cells at end |
| Debug | 16:26:33.275> Recur | 23->24 staying uncleaned: 7 cells now, 7 cells at end |
| Debug | 16:26:33.345> Recur | 24->25 staying uncleaned: 16 cells now, 16 cells at end |
| Debug | 16:26:33.415> Recur | 25->26 staying uncleaned: 14 cells now, 14 cells at end |
| Debug | 16:26:33.485> Recur | 26->27 staying uncleaned: 4 cells now, 4 cells at end |
| Debug | 16:26:33.555> Recur | 33->34 staying uncleaned: 5 cells now, 5 cells at end |
| Debug | 16:26:33.615> Recur | 34->35 staying uncleaned: 4 cells now, 4 cells at end |
| Debug | 16:26:33.685> Recur | 35->36 staying uncleaned: 6 cells now, 6 cells at end |
| Debug | 16:26:33.755> Recur | 55->56 staying uncleaned: 5 cells now, 5 cells at end |
| Debug | 16:26:33.826> Recur | 56->57 staying uncleaned: 7 cells now, 7 cells at end |
| Debug | 16:26:33.906> Recur | 57->58 staying uncleaned: 5 cells now, 5 cells at end |
| Debug | 16:26:33.966> Recur | 67->68 staying uncleaned: 4 cells now, 4 cells at end |
| Debug | 16:26:34.036> Recur | 79->80 uncleaned: 7 cells now, 5 cells at end |
| Debug | 16:26:34.106> Recur | 80->81 staying uncleaned: 12 cells now, 12 cells at end |

-continued

| Log file: | | |
|---|---|---|
| Debug 16:26:34.176> Recur | 81->82 staying uncleaned: 6 cells now, 6 cells at end | |
| Debug 16:26:34.256> Recur | 82->83 staying uncleaned: 5 cells now, 5 cells at end | |
| Debug 16:26:34.356> Recur | 136->137 staying uncleaned: 5 cells now, 5 cells at end | |
| Debug 16:26:34.426> Recur | 13,7->138 staying uncleaned: 9 cells now, 9 cells at end | |
| Debug 16:26:34.527> Recur | 146->147 staying uncleaned: 4 cells now, 4 cells at end | |
| Debug 16:26:34.627> Recur | 152->153 staying uncleaned: 4 cells now, 4 cells at end | |
| Debug 16:26:34.697> Recur | 213->214 staying uncleaned: 17 cells now, 17 cells at end | |
| Debug 16:26:34.807> Recur | 214->215 uncleaned: 54 cells now, 50 cells at end | |
| Debug 16:26:34.907> Recur | 215->216 uncleaned: 115 cells now, 93 cells at end | |
| Debug 16:26:34.977> Recur | 216->217 uncleaned: 255 cells now, 126 cells et end | |
| Debug 16:26:35.127> Recur | 217->218 uncleaned: 123 cells now, 43 cells at end | |
| Debug 16:26:35.198> Recur | 218->219 uncleaned: 91 cells now, 51 cells at end | |
| Debug 16:26:35.268> Recur | 219->220 uncleaned: 76 cells now, 61 cells at end | |
| Debug 16:26:35.338> Recur | 220->221 uncleaned: 69 cells now, 65 cells at end | |
| Debug 16:26:35.408> Recur | 221->222 staying uncleaned: 44 cells now, 44 cells at end | |
| Debug 16:26:35.478> Recur | 222->223 uncleaned: 17 cells now, 14 cells at end | |
| Debug 16:26:35.688> Recur | 239->240 staying uncleaned: 11 cells now, 11 cells at end | |
| Debug 16:26:35.758> Recur | 240->241 uncleaned: 18 cells now, 12 cells at end | |
| Debug 16:26:35.828> Recur | 241->242 uncleaned: 17 cells now, 7 cells at end | |
| Debug 16:26:35.828> Recur | Best cleaning path: 213–223 (564 cells) | |
| Debug 16:26:35.828> Recur | Result FindOmittedAreas: 213–223 (564 cells) | |
| Debug 16:26:35.828> Recur | Find detour after: 247 | |
| Debug 16:26:35.828> Recur | Best branch: 265(=265) 6.75 m | |
| Debug 16:26:35.828> Recur | Good branch: 265(=265) 6.75 m | |
| Debug 16:26:35.828> Recur | Last branch: 466(=466) 17.49 m | |
| Debug 16:26:35.828> Recur | Found detour, insert between 265 and 265 | |
| Debug 16:26:35.828> Recur | Start planning detour | |
| Debug 16:26:35.838> CleanOpt | Plan: 265 200 201 202 203 204 205 206 207 208 209 210 211 212 213 | |
| Debug 16:26:35.838> CleanOpt | Plan: 223 224 225 226 227 228 229 230 231 232 233 234 235 236 237 238 239 240 2 | |
| Debug 16:26:35.838> CleanOpt | 243 244 245 246 247 248 249 250 251 252 253 254 255 256 257 258 259 260 261 262 | |
| Debug 16:26:35.838> CleanOpt | 263 264 265 | |
| Debug 16:26:35.838> Recur | Generated Detour: | |
| Debug 16:26:35.838> Recur | [467] 265 200 201 202 203 204 205 206 207 208 209 210 211 212 213 214 215 216 21 | |
| Debug 16:26:35.838> Recur | [487] 219 220 221 222 223 224 225 226 227 228 229 230 231 232 233 234 235 236 23 | |
| Debug 16:26:35.838> Recur | [507] 239 240 241 242 243 244 245 246 247 248 249 250 251 252 253 254 255 256 25 | |
| Debug 16:26:35.838> Recur | [527] 259 260 261 262 263 264 265 | |
| Debug 16:26:35.838> Recur | ********* Detour ready ********* | |
| 1 16:26:35.838> Recur | detour 265 (6.7 m) [213...223] (14.8 m) 265 (for 564 cells) waiting | |
| Debug 16:26:35.838> Recur | Time:2 sec Lat: 0 | |
| Debug 16:26:35.838> Recur | Will continue searching | |
| Debug 16:26:35.919> Recur | Add detour from 265 to 467. .532:265 | |
| 1 16:26:35.919> ######## | Detour: cleaning program changed! | |
| 2 16:26:35.929> Recur | starts new search for detour | |
| Debug 16:26:36.019> Recur | 5->6 staying uncleaned: 7 cells now, 7 cells at end | |
| Debug 16:26:36.119> Recur | 6->7 staying uncleaned: 6 cells now, 6 cells at end | |
| Debug 16:26:36.209> Recur | 7->8 staying uncleaned: 7 cells now, 7 cells at end | |
| Debug 16:26:36.299> Recur | 23->24 staying uncleaned: 7 cells now, 7 cells at end | |
| Debug 16:26:36.419> Recur | 24->25 staying uncleaned: 16 cells now, 16 cells at end | |
| Debug 16:26:36.519> Recur | 25->26 staying uncleaned: 14 cells now, 14 cells at end | |
| Debug 16:26:36.610> Recur | 26->27 staying uncleaned: 4 cells now, 4 cells at end | |
| Debug 16:26:36.700> Recur | 33->34 staying uncleaned: 5 cells now, 5 cells at end | |
| Debug 16:26:36.790> Recur | 34->35 staying uncleaned: 4 cells now, 4 cells at end | |
| Debug 16:26:36.900> Recur | 35->36 staying uncleaned: 6 cells now, 6 cells at end | |
| Debug 16:26:36.990> Recur | 55->56 staying uncleaned: 5 cells now, 5 cells at end | |
| Debug 16:26:37.110> Recur | 56->57 staying uncleaned: 7 cells now, 7 cells at end | |
| Debug 16:26:37.230> Recur | 57->58 staying uncleaned: 5 cells now, 5 cells at end | |
| Debug 16:26:37.351> Recur | 67->68 staying uncleaned: 4 cells now, 4 cells at end | |
| Debug 16:26:37.461> Recur | 79->80 uncleaned: 7 cells now, 5 cells at end | |
| Debug 16:26:37.581> Recur | 80->81 staying uncleaned: 12 cells now, 12 cells at end | |
| Debug 16:26:37.671> Recur | 81->82 staying uncleaned: 6 cells now, 6 cells at end | |
| Debug 16:26:37.761> Recur | 82->83 staying uncleaned: 5 cells now, 5 cells at end | |
| Debug 16:26:37.851> Recur | 136->137 staying uncleaned: 5 cells now, 5 cells at end | |
| Debug 16:26:37.941> Recur | 137->138 staying uncleaned: 9 cells now, 9 cells at end | |
| Debug 16:26:38.032> Recur | 146->147 staying uncleaned: 4 cells now, 4 cells at end | |
| Debug 16:26:38.122> Recur | 152->153 staying uncleaned: 4 cells now, 4 cells at end | |

-continued

Log file:

```
Debug  16:26:38.492> Recur      Best cleaning path: 23–27 (41 cells)
Debug  16:26:38.492> Recur      No dirt spot big enough for detour
...
  2    16:27:39.290> Recur starts new search for detour
Debug  16:27:42.404> Recur      Best cleaning path: 23–27 (41 cells)
Debug  16:27:42.404> Recur      No dirt spot big enough for detour
...
  2    16:38:34.131> Recur starts new search for detour
Debug  16:38:34.151> Recur      Best cleaning path: 23–27 (41 cells)
Debug  16:38:34.151> Recur      No dirt spot big enough for detour
...
  1    16:38:41.332> Mission - execution of path 'PATHS' successfully finished
-------------------------> -----------------------------------------------------
------------
  2    16:38:42.193> Global Grid Statistics
  2    16:38:42.193> Path 'PATHS', started 23.05.2001 16:01:08, duration 37:34 minutes
-------------------------> -----------------------------------------------------
------------
  2    16:38:42.193>   To be cleaned: 63.12 square meters, 100.00%, 18134 cells
  2    16:38:42.193>   Already wet: 0.00 square meters, 0.00%, 0 cells
  2    16:38:42.193>   Cleaned: 62.26 square meters, 98.63%, 17886 cells
  2    16:38:42.193>   Still wet: 0.00 square meters, 0.00%, 0 cells
  2    16:38:42.193>   Still dirty: 0.86 square meters, 1.37%, 248 cells
-------------------------> -----------------------------------------------------
------------
-------------------------> -----------------------------------------------------
------------
  2    16:38:42.193> Recur Statistics
-------------------------> -----------------------------------------------------
------------
  2    16:38:42.193> No|sec lat|           path              |spot dirty cleaned
  2    16:38:42.193> --+-------+-----------------------+-------------------------
  2    16:38:42.193> 11 2 01 265< 6.7 m> 213–223< 14.8 m> 2651 564 41 523
  2    16:38:42.193> --+-------+-----------------------+-------------------------
  2    16:38:42.193> Extra way: 21.5 meters. Extra time: 3:53 minutes.
  2    16:38:42.193> Cleaned 523 cells = 1.8 square meters altogether.
  2    16:38:42.193> 93% of targeted dirt reached.
-------------------------> -----------------------------------------------------
```

The invention has been described in detail with particular reference to preferred embodiments thereof and examples, but it will be understood that variations and modifications can be effected within the spirit and scope of the invention.

The invention claimed is:

1. A method for programming an extended path for an autonomous mobile unit, comprising:
   determining an untraversible sub-section of a predefined path that cannot be traversed by the autonomous mobile unit;
   determining a first path point of the predefined path using at least one predefinable distance criterion which takes into consideration a distance from the untraversible sub-section to the first path point;
   determining an extension sub-section that begins at the first path point, terminates at a second path point of the predefined path, and encompasses at least the untraversible sub-section; and
   programming the extended path by integrating the extension sub-section into the predefined path at the first path point.

2. A method according to claim 1, wherein said determining the first path point employs further criteria.

3. A method according to claim 2, wherein one of the further criteria is a cinematic criterion taking into consideration a cinematic characteristic of the autonomous mobile unit.

4. A method according to claim 2, wherein the further criteria includes at least one of a time criterion and a processing criterion taking into consideration at least one of a travel time and a travel route of the autonomous mobile unit.

5. A method according to claim 4, wherein the extension sub-section includes at least one further sub-section of the predefined path.

6. A method according to claim 5, wherein the extension sub-section is formed primarily of sub-sections of the predefined path.

7. A method according to claim 6, wherein the second path point is identical to the first path point.

8. A method according to claim 6, wherein the second path point is situated on the predefined path after the first path point.

9. A method according to claim 8, further comprising employing recursive path programming where the extended path, determined in a preceding iteration, is treated as the predefined path of a subsequent iteration.

10. A method according to claim 9, wherein the autonomous mobile unit is a cleaning robot.

11. A method according to claim 10 wherein the cleaning robot cleans the predefined path.

12. A system for programming an extended path for an autonomous mobile unit, comprising:
    a blocked path unit determining an untraversible sub-section of a predefined path; and
    a path programming unit, coupled to said blocked path unit, determining a first path point of the predefined path using at least one predefinable distance criterion which takes into consideration a distance from the untraversible sub-section to the first path point, an extension sub-section that begins at the first path point, terminates at a second path point of the predefined path, and encompasses at least the untraversible sub-section, said path programming unit programming the extended path by integrating the extension sub-section into the predefined path at the first path point.

13. A system according to claim 12, wherein said path programming unit is a computer processor.

14. A system according to claim 13, wherein said obstacle detection unit includes the computer processor and an obstacle detection device.

15. A computer-readable storage medium storing instructions to control a processor to execute a method for programming an extended path for an autonomous mobile unit, said method comprising:

determining an untraversible sub-section of a predefined path that cannot be traversed by the autonomous mobile unit;

determining a first path point of the predefined path using at least one predefinable distance criterion which takes into consideration a distance from the untraversible sub-section to the first path point;

determining an extension sub-section that begins at the first path point, terminates at a second path point of the predefined path, and encompasses at least the untraversible sub-section; and programming the extended path by integrating the extension sub-section into the predefined path at the first path point.

* * * * *